Dec. 5, 1967  E. L. ZEBROSKI  3,356,585
VENTED FUEL SYSTEM
Filed May 8, 1967
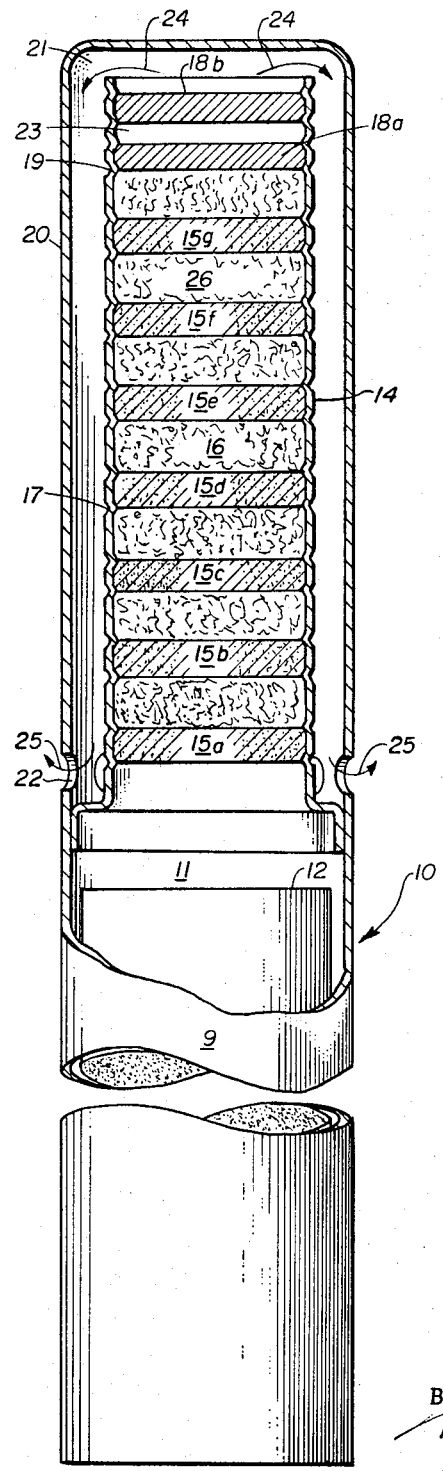
INVENTOR.
EDWIN L. ZEBROSKI
BY
ATTORNEY

United States Patent Office 3,356,585
Patented Dec. 5, 1967

3,356,585
VENTED FUEL SYSTEM
Edwin L. Zebroski, Los Altos, Calif., assignor to the United States of America as represented by the United States Atomic Energy Commission
Filed May 8, 1967, Ser. No. 637,881
10 Claims. (Cl. 176—68)

ABSTRACT OF THE DISCLOSURE

A vent for a nuclear reactor fuel element permitting the delay of gaseous and volatile fission products until a substantial portion of the radioactive precursors have decayed and the control of the release of long-lived gaseous and volatile radioactive fission products.

Background of the invention

The invention described herein was made in the course of, or under, Contract No. AT (04–3)–189, Project Agreement No. 10, with the United States Atomic Energy Commission.

This invention relates to fuel elements for nuclear reactors, and in particular to devices and systems for delaying the release of gaseous fission products from the fuel element.

In all nuclear reactors, the fission of fissile fuel produces many radioactive fission products, among which are included in particular the gaseous fission product isotopes xenon 133, xenon 135, xenon 140, krypton 85, and krypton 89. The evolution of such gases results in increased pressure within the fuel element and the consequent swelling of the cladding unless the gases are allowed to escape. Such swelling may be sufficient at times to cause the ultimate strength of the cladding material to be exceeded, with the resulting release of dangerous radiocative material in the form of fuel and short-lived fission products into the coolant of the reactor, as well as exposure of the fissile fuel to the coolant with the possible chemical reaction therewith.

The reactor systems of the prior art alleviated this condition by either venting the fission product gases and volatile materials directly from the fuel element to a fission product trapping system exterior to the reactor, or constructing the cladding of heavy enough material to contain and withstand the gas pressure for the life of the fuel element.

The former system, involving separate venting for each fuel element, although quite efficient in the removal of gaseous fission products from the reactor core, requires complicated connections from each fuel element to the gas venting system, or large plenums (i.e., approximately equal to the active fuel length) which result in the increased possibility of leakage of dangerous radioactive material, either in service or during handling.

The latter sytem of retaining the gaseous fission products in the fuel element, although simple in its solution, results in a substantial reduction in the reactor efficiency. The larger thickness and volume of cladding material necessary to withstand the added pressure forces also tends to absorb a greater number of neutrons which would be better utilized in the fission reaction.

Summary of Invention

The venting system of the present invention eliminates the above problems by first delaying the gaseous fission products in the venting device until a substantial amount of such gas has decayed to non-gaseous isotopes, and then, when a predetermined range of pressures inside the fuel element is reached, releasing directly into the coolant or other system primarily the gaseous-type isotopes having a longer half-life and stable isotopes of the rare gases. The fission product gases released into the coolant may then be vented when convenient, or else removed by processing the coolant through separate means common in the art. Because the short-lived gaseous precursors of the solid fission products are delayed and thus largely decay in the vent, only long-lived gaseous and volatile fission products and their daughters will be present in the coolant, thus simplifying the processing system and apparatus needed for their removal from the coolant.

The delay in the passage of fission product gases through the vent and out of the fuel element is achieved by two serially arranged means: first, by a plurality of porous members through which the gas must pass by both diffusion and by forced flow due to a pressure differential across the members; and second, by a controlled leak or valve means which permits only a very small flow of gas approximately proportional to the internal pressure reached in the fuel element. The purpose of the special valve means is to permit the flow of gas out of the vent and at the same time prevent the reverse flow of any coolant or coolant vapors back into the vent. Prevention of the backflow of coolant into the vent and fuel element is especially important where a fuel is used which is reactive to the coolant, or where the valve characteristics may be changed as a function of time by contact with the coolant (such as corrosion).

It is therefore an object of this invention to provide a venting system for a nuclear reactor fuel element which delays the release of fission product gases out of the fuel element.

It is a further object of this invention to provide a venting system for a nuclear reactor fuel element which permits a major portion of the gaseous fission products to decay to non-gaseous isotopes before any gaseous fission products are released.

It is also an object of this invention to provide a device for controlling a very small flow of fission product gases out of the fuel element at a rate proportional to the internal gas pressure in the fuel element.

It is another object of this invention to provide a venting system for a nuclear reactor fuel element which prevents the backflow of coolant and coolant vapors into the vent and the fuel element.

It is still another object of this invention to provide a venting system for a nuclear reactor fuel element which permits the safe release of gas pressure within the fuel element when an over-power or over-temperature transient occurs.

It is another object of this invention to limit the amount of fission gases which can rapidly escape from a newly-formed defect in the fuel element cladding material.

Other and more particular objects of this invention will be manifest upon study of the following detailed description when taken together with the accompanying drawing, in which:

Brief description of the drawing

The single figure is a partial longitudinal section through the venting system of this invention, showing the venting device and its association with the fuel element.

Description of the preferred embodiment

During the operation of a nuclear reactor, certain radioactive fission product gases are created along with other volatile and non-volatile fission products. For example, in Table I is listed some of the gaseous isotopes, their decay products and half-lives which are most pertinent in the use and operation of this invention.

TABLE I

Xenon 133  5.3d→cesium 133
Xenon 135  9.2h→cesium 135
Xenon 140  16s→cesium 140  66s→barium 140
Krypton 85  10.4y→rubidium 85
Krypton 89  3.2m→rubidium 89  15m→strontium 89

Using the information in Table I for xenon 133, if this isotope were delayed and retained in the vent for 50 days (1200 hours), only $1 \times 10^{-3}$ of the original amount of this isotope would be left to vent in the coolant. For the same period of time, only $1 \times 10^{-39}$ of the original amount of xenon 135 would remain for venting into the coolant. In other words, compared with a system which vented the fission product gases immediately and directly into the coolant, by using the venting system of the present invention, the cesium 133 is reduced by a factor of $10^3$, while the cesium 135 is reduced by a factor of $10^{39}$. As for barium 140 and strontium 89, since the half-lives of their gaseous precursors xenon 140 and krypton 85, respectively, are of the order of seconds and minutes, essentially none of these isotopes would be released from the vent after a 50-day delay. The only remaining fission product gas leaving the vent in any appreciable amount compared with the amount originally created would be krypton 85 which has a half-life of 10.4 years. Therefore, for the above enumerated fission product gases, it is highly desirable to delay their release from the vent or fuel element until they have, to the greater extent, decayed to a non-gaseous isotope and deposited in the vent, either by condensation, adsorption or chemical combination with a gettering agent.

With reference to the single figure, the fission gas vent of this invention is preferably sealed to the upper end of a typical fuel rod or element 10, in fluid communication with plenum 11 for accumulation of fission product gases and vapors above the fissile fuel, fertile blanket material or moderator material 12.

In structure, the vent comprises an inner conduit or tube 14, open at both ends, with the lower end opening into plenum 11. Immediately above plenum 11, and in the lower portion of conduit 14, are disposed a plurality of porous planar spaced-apart members 15a through 15g. These members are each retained in place by swaged portion indentation 17, which serves to prevent longitudinal movement of the members and preserve their spaced-apart relation. For reasons described later, porous members 15a–g should not be fixed in place by welding, brazing or the like, but rather the walls of the conduit 14 must be free to flex outwardly so that gradual or sudden increases in gas pressure within the fuel element may be relieved. During normal operation, porous members 15a–g are arranged to fit tightly within conduit 14, causing the gases to pass through, rather than around, the porous members.

A valve means is provided proximate the upper end of conduit 14, away from plenum 11. In the embodiment illustrated, this valve means comprises two planar, spaced-apart, solid or impermeable members 18a and 18b, which are retained in conduit 14 by indentations 19. These two members are arranged to fit tightly into conduit 14 so that the release of any gas will occur only between the peripheral edge of the members and the wall of conduit 14 when a predetermined pressure level is reached. Indentations 19 will prevent the longitudinal movement of impermeable members 18a and 18b, resulting from the internal gas pressure in conduit 14. Although two impermeable members are shown, one member would perform the same general function; however, with a greater possibility of leakage. More reliability might be achieved with more than two members.

A containment cover or shroud 20 is arranged concentric about and spaced apart from conduit 14 to define a plenum 21 along the sides and top of conduit 14. Containment cover 20 is sealed and affixed as by welding or the like to the lower portion of conduit 14, and is further provided with a plurality of ports 22 along its lower portion which communicate directly with the coolant outside the fuel element. Plenum 21 performs two functions: (1) It acts as a passage through which fission product gases leaving the valve means proximate the top of conduit 14 are guided to the exterior of the fuel element; and (2) it more importantly acts to prevent coolant outside the fuel element from flowing into the vent and valve portions to clog or disturb their operations. It can be seen that if the coolant were to flow into the plenum 21 through ports 22, the gases in plenum 21 would be trapped in the upper portion, and would be compressed until the internal pressure of the gas equaled the external pressure of the coolant. The whole volume of plenum 21 can be sized to preclude coolant from rising above the top of conduit 14 for any range of anticipated external pressures.

In operating the above-described fission product vent, fission product gases generated within the fissile fuel pass up through fuel element 10 where they are initially collected in plenum 11. With increase in gas pressure during the life of the fuel element due to thermal expansion of the residual gases, as well as generation of fission product gases, there will be a gradual flow of gas through porous members 15a–g due to a pressure difference across each member, as well as diffusion through each member.

Porous members 15a–g should preferably have a pore size ranging from about <1 micron in diameter to about 10 microns in diameter. The volume of each member should also have a volume generally not less than 20% of the volume of the space between the members. It is preferably that these porous members be arranged in conduit 14 with the member having the largest pore size placed nearest plenum 11, with the remaining four members grading down in pore size to the smallest which is situated furthest away from plenum 11. For example, porous member 18a should have a pore size of 10 microns in diameter. Porous member 15g would have a pore size of <1 micron in diameter. Porous members 15b, 15c, 15d, 15e and 15f would have decreasing pore sizes of from slightly less than 10 microns for 15b to <1 micron for 15f, respectively.

In time, under normal operating conditions, a sufficient amount of gaseous fission products will reach the spacer between the uppermost porous member 15g and impermeable member 18a. The gas accumulated in the space will be released when a sufficient pressure is reached which causes elastic expansion of the wall of conduit 14 at the peripheral edge of member 18a. When expansion occurs, gas will flow around the peripheral edge of member 18a into the space between members 18a and 18b. In a similar manner, when the pressure in this space increases to again elastically expand the wall of conduit 14, gas will escape into plenum 21. After the pressure within these spaces is released the wall of conduit 14 will return generally to its original position and continue to maintain a gas-tight seal until the pressure again increases in conduit 14. The pressure at which the valve means comprising impermeable members 18a and 18b will release gas may be established by adjusting the peripheral dimensions of members 18a and 18b to maintain a specific initial circumferential tensile stress in the wall of conduit 14. When the internal gas pressure within the conduit causes a circumferential tensile stress in the wall of the conduit equal to the initial stress, gas will then begin to escape. For example, a flow rate of approximately $2 \times 10^{-6}$ cc. per second will result at 100 p.s.i. when an initial elastic strain is established giving .004 mil deflection for a 0.180-inch O.D. stainless steel tube having a wall thickness of .006 inch.

As previously cautioned, porous members 15a–g must not be brazed or welded to the wall of conduit 14, since this would not permit the release of gas within the fuel element in the event of an overpressure transient, or in the event there is partial or complete plugging of the porous member. In such event, gases within plenum 11 are allowed to escape around the peripheral edge of porous members 15a–g when the wall of conduit 14 elastically expands under pressure in a manner identical to that of the valve means comprising impermeable members 18a and 18b described above. Thus the vent structure disclosed herein will additionally prevent damage to the fuel element for pressure increases resulting from plugging of the porous members, or from power or temperature transients, as well as delay the release of gaseous fission products.

Optionally, a fibrous material 26 may be disposed between each porous member 15a–g and 18a in order to provide a large surface area upon which solid fission products may deposit. Fibrous material 26 may be any substance which will withstand the temperatures encountered in a nuclear reactor and not appreciably deteriorate by chemical reaction with the fission products. A fibrous material is mentioned as the most feasible material; however, any granular material with a high surface-to-volume ratio ($<10^3$ cm.) and low bulk theoretical density ($>50\%$), which results in large interspaces between particles for free flow of the gases, will prove satisfactory. The fibrous materials may be a random mesh material such as glass, quartz or stainless steel wool, or a woven mesh of stainless steel or zirconium or titanium wire or glass or quartz filaments. As a group, the above materials might best be described as foraminous materials, wherein the open cross sectional areas should generally not total less than the closed cross sectional areas, i.e., greater than a 50–50 open-to-closed area ratio, and the fiber or wire diameter should generally not be greater than about 0.01 inch.

In the case of short-lived fuel elements, foraminous or fibrous material 26 may be dispensed with in favor of deposition of the decay isotopes in and on the surface of porous members 15a–g. For long-lived fuel elements, it will be desirable to employ materials 26 in any one or more of the spaces between members 15a–g and 18a, and additionally, it may be desirable to apply a gettering agent such as silver, copper or other metal or charcoal having traces of such metal contained therein, or other compounds which react to produce a non-volatile compound with iodine, to the surface of material 26 to chemically combine with or absorb some of the fission product gases, thus further reducing the volume of gases.

It is important in the construction and operation of the venting device of this invention to maintain certain volume ratios relative to the volume of fissile fuel associated with the vent. The free volume of the region containing porous members 15a–g should preferably be from 0.10 to 0.20 of the volume of active fissile fuel; however, greater ratios will also permit satisfactory operation. The volume of the space between porous member 15g and impermeable member 18a should preferably be not less than 0.25 of the volume of the active fissile fuel. Thus the total volume of the vent should be generally not less than 0.35 of the volume of the active fissile fuel providing fission products to the vent.

To illustrate, the following is an example of the volume required for a vent to delay the release of the long-lived radioactive isotope krypton 85 for a period greater than 50 days (1200 hours):

Assuming the rate of krypton 85 evolution is approximately $2\times10^{-6}$ cc. per second at average conditions of 100 p.s.i. and 600° C. within the fuel pin for a fissile fuel volume of 20 cc., a vent volume of 7 cc. (0.35 of the fissile fuel volume), and a plenum 11 volume of 4 cc. (0.20% of the fissile fuel volume), then $$D=\frac{V_1+V_2}{R(8.6\times 10^4)}$$

where $V_1$=vent volume in cc.
$V_2$=plenum 11 volume in cc.
$R$=rate of creation of Kr-85=$2\times10^{-6}$ cc./sec.
$D$=delay time in days
$8.6\times 10^{-4}$=number of seconds in one day Substituting the above values, delay time will be 64 days. The actual delay time, however, will be slightly shorter than this, due in part to diffusion of the gas through the porous members and in part to temperatures and resulting pressure cycling of the fuel during operation of the reactor.

It can be seen, therefore, that knowing the volume rate of production of the long-lived gaseous fission products and the diameter of the fuel element, the length of the vent section may be calculated. Table II is a listing of the pertinent dimensions and parameters of a typical gas vent of this invention.

TABLE II

Inner conduit I.D.=.190
Inner conduit wall thickness=.010
Containment cover O.D.=.250″
Vent length=5 feet
Plenum 11 volume=4 cm.$^3$
Porous member thickness=.060″
Porous member spacing=8″
Number of porous members=7 (typical; range 1 to 8)
Porous member material=stainless steel, sintered, Pwd. product "micrometallic" or equivalent
Foraminous material=stainless steel or Ti or Zr wire mat
Diameter fiber size=.005 to .010 wire mat wool
Free vent volume=31 cm.$^3$ (typical; range 0.35 to 1.2 $V_f$)
Volume of fissile fuel =44 cm.$^3$ (typical; range 15 to 90 cc.)
Rate of emission of Kr-85=$4.4\times10^{-6}$ cc./sec.
Internal pressure=100 p.s.i. (nominal full power, steady state condition)
Operating temperature=600° C. (nominal full power, steady state condition)
Average delay time=42 days (assuming 50% efficiency relative to first-in first-out theoretical limit)

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended clams.

I claim:

1. In a nuclear reactor fuel element having a fission product gas plenum, a fission product delay vent comprising an inner conduit open at both ends, having one end thereof in fluid communication with said fission gas plenum, means within said inner conduit nearest said plenum for delaying the flow of gases from said plenum through said conduit, valve means serially arranged with said delay means proximate the end of said conduit away from said fission product gas plenum for releasing fission product gases from the fuel region to the vent region above a predetermined pressure, and means defining an outer containment vessel concentric about said inner conduit and spaced apart therefrom, defining a plenum along the sides and top thereof, sealed and affixed to said inner conduit proximate the lower end of said conduit, said containment cover having ports proximate the lower portion thereof for the passage of fission product gases out of said vent after delay therein.

2. The apparatus as defined in claim 1, wherein said means for delaying the flow of fission product gases comprises a plurality of spaced-apart, planar porous members disposed normal to the longitudinal axis of said conduit and with peripheries contiguous with the inside wall of said conduit.

3. The apparatus as defined in claim 2, wherein said planar porous members have pore sizes between <1 and 10 microns in diameter.

4. The apparatus as defined in claim 3, wherein the first of said plurality of said planar porous members nearest said fission product gas plenum has a pore size of about 10 microns in diameter, and the last porous member furthest away from said plenum has a pore size of <1 micron in diameter, with the remaining planar porous members between said first and last porous members are arranged in order of decreasing pore size from 10 microns diameter to >1 micron diameter, the largest pore size member adjacent said first porous member.

5. The apparatus as defined in claim 2, wherein the total volume between said plurality of spaced-apart porous members is at least 35% of the fuel volume.

6. The apparatus as defined in claim 2, wherein foraminous material is disposed between said spaced-apart porous members.

7. The apparatus as defined in claim 5, wherein said foraminous material is wire.

8. The apparatus as defined in claim 6, wherein said foraminous material comprises a fibrous mesh and a fission product gettering agent disposed on the surface of the fibers of said mesh.

9. The apparatus as defined in claim 8, wherein said gettering agent is a material selected from the group, silver and copper.

10. The apparatus as defined in claim 1, wherein said valve means comprises at least one planar impermeable member disposed normal to the longitudinal axis of said conduit, and with its periphery contiguously arranged with the inside of said conduit to permit the flow of fission product gases between the periphery of said impermeable member and said inside wall at a predetermined pressure due to the tensile elastic expansion of the wall of said conduit from the pressure of said gas within said conduit.

References Cited

UNITED STATES PATENTS

| | | | |
|---|---|---|---|
| 2,798,848 | 7/1957 | Kingdon | 176—68 X |
| 3,141,829 | 7/1964 | Fortescure et al. | 176—68 |
| 3,238,105 | 3/1966 | McNelly | 176—68 X |
| 3,252,869 | 5/1966 | Koutz | 176—68 |
| 3,274,066 | 9/1966 | Zumwalt | 176—68 |
| 3,275,522 | 9/1966 | Kinsey et al. | 176—68 X |

CARL D. QUARFORTH, *Primary Examiner.*

M. J. SCOLNICK, *Assistant Examiner.*